Sept. 4, 1956 A. CARREAU 2,761,724
CONCRETE PANEL HANDLING APPARATUS
Filed Aug. 31, 1950 2 Sheets-Sheet 1
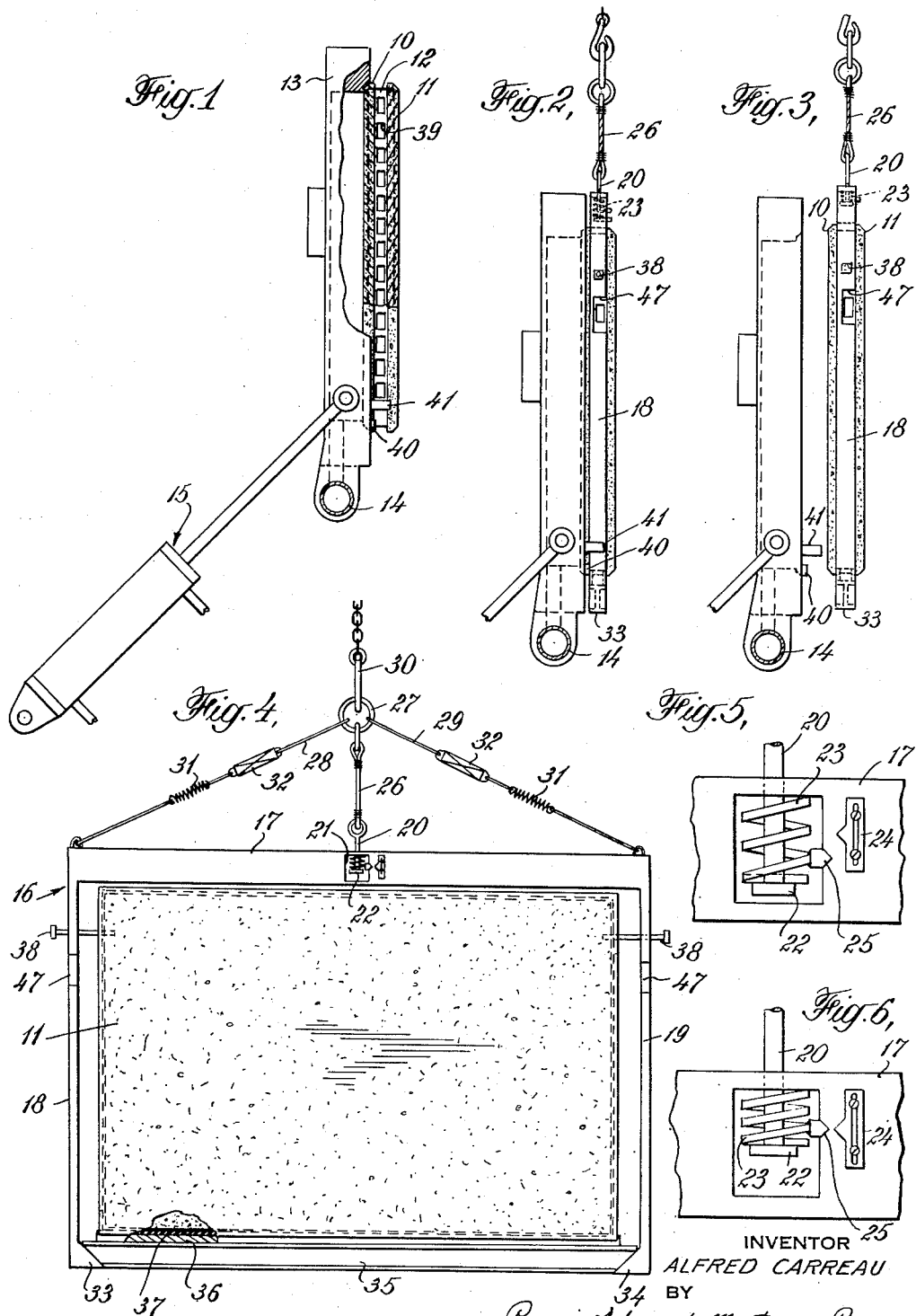
INVENTOR
ALFRED CARREAU
BY
Pennie, Edmonds, Morton and Barrows
ATTORNEY Sept. 4, 1956            A. CARREAU            2,761,724
CONCRETE PANEL HANDLING APPARATUS
Filed Aug. 31, 1950            2 Sheets-Sheet 2
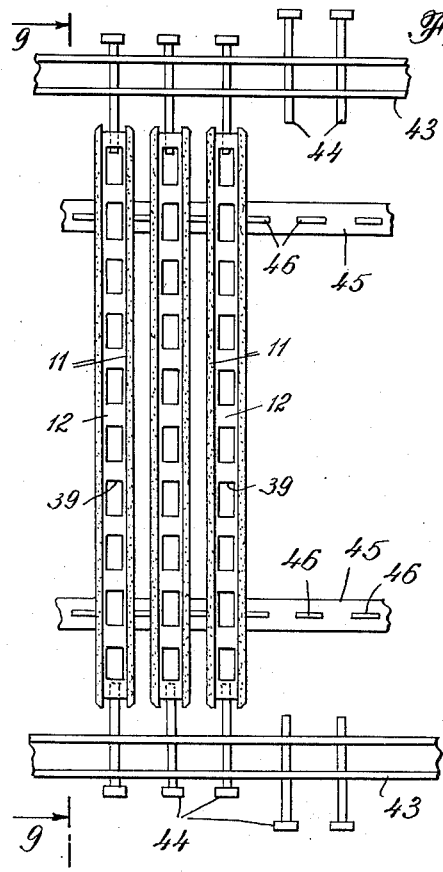
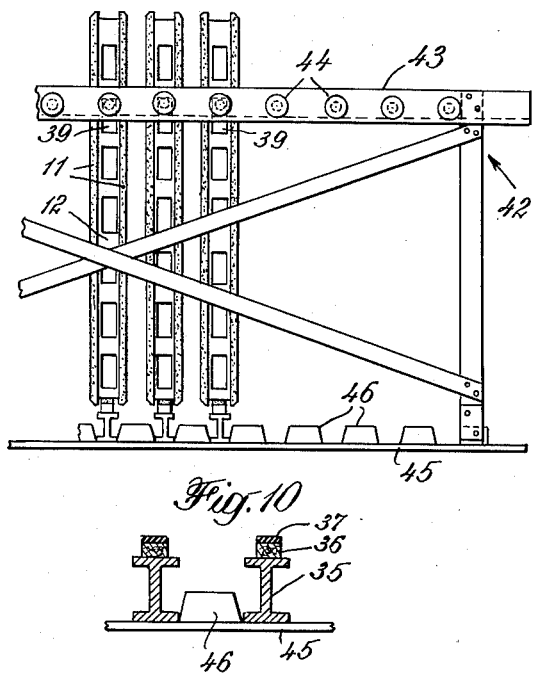
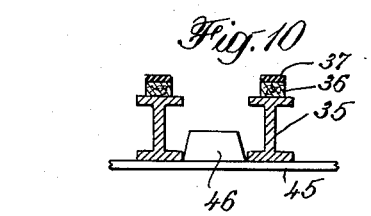
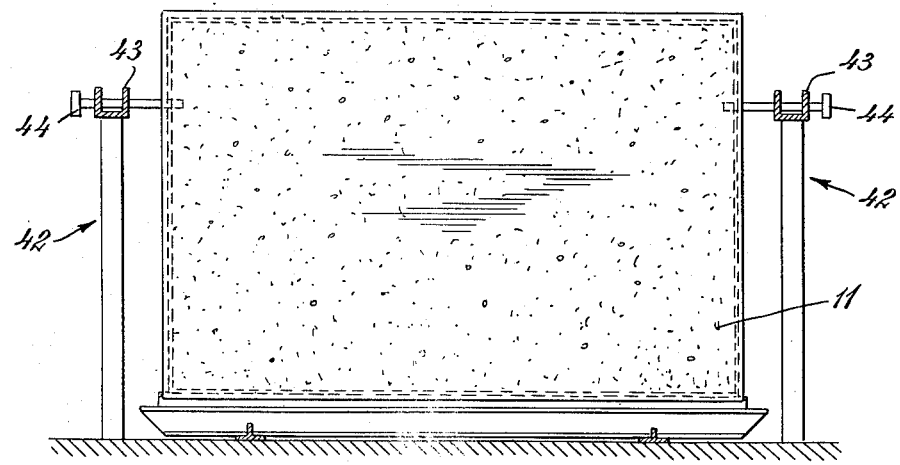
INVENTOR
ALFRED CARREAU
BY
Pennie, Edmonds, Morton and Barrows
ATTORNEYS

United States Patent Office 2,761,724
Patented Sept. 4, 1956

2,761,724

CONCRETE PANEL HANDLING APPARATUS

Alfred Carreau, Union City, N. J., assignor to Daystrom, Incorporated, Elizabeth, N. J., a corporation of New Jersey Application August 31, 1950, Serial No. 182,495

4 Claims. (Cl. 294—63)

This invention relates to apparatus for handling reinforced concrete building panels and more particularly is concerned with an apparatus by which such panels may be readily and safely removed from one of a pair of molds in which they are cast.

The building panels, with which the apparatus of the invention is particularly adapted for use, are of a type which comprise a pair of spaced concrete slabs interconnected by a reinforcing cage which is partially embedded in the opposing faces of the slabs. Such panels may be made by any suitable process and with any suitable machinery, but a particularly satisfactory method and apparatus for making them are described in Patent No. 2,701,904 in the name of Burns Roensch and assigned to the same assignee as this application. Panels made in accordance with the disclosure of that application are preferably removed from the casting molds before they have become completely dry and set.

In this condition the panels are necessarily rather susceptible to damage particularly if they are roughly handled or subjected to jarring of any type or if the concrete portions thereof are touched by a handling apparatus. The apparatus with which they are removed should therefore only engage the reinforcing cage and must be such that it imparts no shocks to a panel to be moved by it. Such an apparatus is the subject of this invention.

The molding apparatus of the aforementioned patent comprises a pair of molds set one beside the other. A concrete mixture is poured into each mold and a reinforcing cage partially embedded in the concrete mixture of one mold. A vacuum is then drawn beneath the concrete mixture in the latter mold and after a predetermined length of time during which the concrete mixture in that mold has most of its water removed, that mold is inverted to a position in opposition to the other mold, and the molds are moved relative to one another until the reinforcing cage becomes embedded in the concrete mixture on the non-inverted mold. A vacuum is then drawn below the concrete mixture of the non-inverted mold to withdraw most of the water from that mixture. The vacuum is discontinued on the inverted mold and this mold is then returned to its initial position. The mold which contains the completed, partially set panel is then moved to a vertical position, during which movement its vacuum is maintained. The panel is ready for removal upon discontinuance of the vacuum. My handling apparatus is adapted to lift the completed panel from the vertically disposed mold and remove it to a storage rack without any damage being incurred.

According to this invention, my handling apparatus comprises a U-shaped member which may be brought up to the face of the vertically disposed mold to surround the top and side edges of the panel. A panel supporting member is supported by and between the outer ends of the arms of the U-shaped member and is disposed beneath the lower edge of the panel when the U-shaped member is in position for removal thereof from the mold. A resilient lifting means is secured to the base of the U-shaped member whence a lifting force may be applied to it without danger of jarring the panel. When the U-shaped member is lifted, the panel supporting member extending between the ends of its arms is adapted to engage the reinforcing cage of the panel without engaging the edges of either of the concrete slabs. The resilient lifting means includes means for indicating when the lifting force applied to the U-shaped member equals the weight of a panel. When this is indicated, the vacuum being drawn in the vertical mold may be discontinued and the panel gently lifted therefrom, by moving the U-shaped member away from the mold, and removed to a suitable storage rack.

Use of my handling apparatus reduces to a minimum the possibility of damaging a panel in removing it from the mold. Furthermore, it is of a simple and uncomplicated construction, inexpensive to make and easily operated.

For a more detailed description of one form of apparatus, which comes within the scope of my invention, reference may be made to the accompanying drawings in which:

Fig. 1 is an elevation view of a vertically disposed mold containing a completed panel;

Fig. 2 is a similar view of the mold and panel with my handling apparatus in position for removal of the panel;

Fig. 3 is an elevation showing the panel removed from the mold;

Fig. 4 is a front view of the handling apparatus supporting a panel;

Fig. 5 is an enlarged fragmentary view of the resilient lifting means as it appears when there is no panel supported in the handling apparatus;

Fig. 6 is a view similar to Fig. 5 except that a panel is supported in the handling apparatus;

Figs. 7 and 8 are respectively a plan view and an elevation view of several panels in a storage rack;

Fig. 9 is a front elevation of a panel supported in the rack; and

Fig. 10 is a sectional view of a pair of panel supporting members.

Referring first to Fig. 1 there is illustrated, a portion of a molding machine for making reinforced concrete building panels each of which comprises a pair of concrete slabs 10 and 11 interconnected by a reinforcing cage 12 which is partially embedded in their opposing faces. The complete molding machine, which forms no part of this invention and which is therefore not herein fully illustrated, is fully disclosed in Patent No. 2,701,904. That portion of it which is herein illustrated comprises a mold 13 supported on a hollow pivot 14. The panel is formed with mold 13 at horizontal position but for its removal therefrom the mold must be pivoted to a vertical position as shown and for this purpose a hydraulic jack 15 is provided. Prior to and during movement of the mold from its horizontal position to its vertical position, a vacuum is drawn, from the mold beneath the panel through hollow pivot 14. This vacuum is maintained to retain the panel in the mold until my handling apparatus, which will now be described, is brought into position to support the panel.

The handling apparatus is illustrated in Figs. 2–6 and comprises a U-shaped member indicated generally at 16 and having a base portion 17 and arms 18 and 19. A lift rod 20 extends through a portion of base 17 of the U-shaped member into an opening 21 therein. The lower end 22 of rod 20 is enlarged and is adapted to engage one end of a spring 23 which surrounds the shank of rod 20 and engages at its other end the upper wall of opening 21. It will thus be apparent that rod 20 is connected to the U-shaped member 16 only through spring 23 and any lifting force applied therethrough to the U-shaped member will be applied through the spring.

Adjacent the opening 21 in base 17 of the U-shaped member and adjustably secured to base 17 is a pointer 24. A corresponding pointer 25 is secured to spring 23 and moves relative to pointer 24 upon compression or expansion of spring 23. As a lifting force is applied to rod 20 spring 23 is compressed and pointer 25 approaches a position of horizontal alignment with pointer 24. When the relative positions of pointers are as shown in Fig. 5 they indicate that no lifting force is being applied to rod 20. When, however, a lifting force equal to the weight of a panel in the apparatus is applied to rod 20, pointers 24 and 25 will come into horizontal alignment as indicated in Fig. 6. The adjustability of pointer 24 is for the purpose of adapting the handling apparatus for use with panels of different weights.

The upper end of rod 20 is connected by a chain or cable 26 to a ring 27 which in turn is connected by guides 28 and 29 to the extremities of base 17 of the U-shaped member. Ring 27 is adapted to receive a hook 30 by which the entire apparatus may be lifted. Each of guides 28 and 29 includes a spring 31 and a turnbuckle 32, the springs 31 being provided to retard swaying of the U-shaped member and the turnbuckles for adjustment of the length of the guides whereby the U-shaped member may be maintained level.

Inwardly extending projections 33 and 34 are found on the outer ends of arms 18 and 19 of the U-shaped member 16. These projections are adapted to engage the beveled ends of an I-beam 35 and thereby support it between them. A wooden sleeper 36, supporting a rubber cushion 37, rests on the upper surface of I-beam 35.

A pair of locking pins 38 extend through arms 18 and 19 of the U-shaped member inwardly of their outer ends and are adapted to enter openings 39 in the reinforcing cage 12 of a panel supported in the handling apparatus to maintain the panel upright therein.

The operation of the handling apparatus as above described is as follows: The U-shaped member 16 with a supporting I-beam 35 is brought up to the face of mold 13 as shown in Fig. 2. The proper positioning of the apparatus with respect to a slab supported in the mold is controlled by a pair of adjustable depth stops 40 secured to the face of the mold and by a pair of guides 41 also secured to the face of the mold. By means of depth stops 40 the handling apparatus may be properly positioned with respect to the mold so that sleeper 36 and cushion 37 lie directly below the lower edge of frame 12 and when substantially raised will engage only the cage and not either of the concrete slabs. Guides 41, however, serve to position the U-shaped frame member centrally with respect to the longitudinal extent of the mold and a slab contained therein.

When the handling apparatus has been brought to the proper position with respect to the panel and mold as shown in Fig. 2, a lifting force may be applied to it through cable 26 and rod 20. As the U-shaped frame is lifted rubber cushion 37 comes into contact with the lower edge of the reinforcing cage 12 and any shock that might be imparted to the panel as it is engaged by the handling apparatus is cushioned. When the lifting force has been increased to such an extent that pointers 24 and 25 are in horizontal alignment the total weight of the panel is being supported by the handling apparatus. Locking pins 38 are then projected into opening 39 in the reinforcing cage. At this time the vacuum being drawn through pivot 14 may be discontinued and the handling apparatus moved out from the mold, as seen in Fig. 3, carrying the panel with it.

In Figs. 7–9 there is illustrated a storage rack that is particularly adapted for storing panels as they are removed from a molding machine by my handling apparatus. In this rack the panels are effectively separated from one another and may be safely left to dry while resting entirely upon their reinforcing cages.

The rack comprises a pair of oppositely disposed frames 42 supporting on their upper edges channel irons 43 in which there are slidably supported a plurality of locking pins 44. A pair of parallel metal sleepers 45 are disposed longitudinally of the rack and contain a plurality of spacers 46 secured to the upper surface thereof. When a panel has been removed from the molding apparatus by my handling apparatus it may be transported thereby to the storage rack and deposited in the rack with the panel supporting I-beam 35 of the handling apparatus resting on sleepers 45 between a pair of spacers 46. A pair of opposite locking pins 44 of the storage rack are projected into opposite openings 39 through cut-out portions 47 in the arms 18 and 19 of the U-shaped member of the handling apparatus. At the same time the locking pins 38 carried by the handling apparatus may be withdrawn from the other openings 39 of the cage. The U-shaped member is then lowered and withdrawn from the storage rack leaving the panel supported there on the I-beam 35. Another I-beam is picked up by the U-shaped member and the handling apparatus is then ready for removal of another panel.

It will be understood that numerous modifications may be made in the apparatus as disclosed without departing from the scope of my invention as set forth in the appended claims.

I claim:

1. Apparatus for handling reinforced concrete building panels which comprises a substantially U-shaped member, a panel supporting member adapted to be supported by and between the outer ends of the arms of the substantially U-shaped member to support a panel between said arms, a lift rod or cable resiliently connected to the base of the U-shaped member substantially centrally thereof, and a guide including a spring extending from each extremity of the base of the U-shaped member to the outer end of the lift rod or cable to resiliently retard swaying of the U-shaped member.

2. Apparatus according to claim 1 which includes a locking pin mounted in one arm of the U-shaped member intermediate its ends and adapted to engage an edge of a supported panel to maintain it in upright position, the panel-supporting member being removably supported by and between the outer ends of the arms of the U-shaped member, and a resilient cushion on the surface of the panel supporting member which is adapted to engage a panel.

3. Apparatus for handling reinforced concrete building panels which comprises a substantially U-shaped member, a panel supporting member adapted to be supported by and between the outer ends of the arms of the U-shaped member to support a panel between said arms, and a locking pin mounted in each arm of the U-shaped member intermediate its ends, said locking pins extending inwardly from their respective supporting arms and being movably mounted therein for movement inwardly to engage opposite edges of a panel supported between said arms to maintain it in an upright position therebetween.

4. Apparatus as set forth in claim 3 in which the panel supporting member is adapted to be removably supported by and between the outer ends of the arms of the U-shaped member and which includes a resilient cushion on the surface of the supporting member which is adapted to engage a panel.

References Cited in the file of this patent

UNITED STATES PATENTS

| | | |
|---|---|---|
| 480,141 | Scharf | Aug. 2, 1892 |
| 932,581 | Rosenthal | Aug. 31, 1909 |
| 1,112,866 | Slutman | Oct. 6, 1914 |
| 1,216,291 | Diescher | Feb. 20, 1917 |
| 1,587,904 | Duncan | June 8, 1926 |
| 1,590,698 | Ray | June 29, 1926 |
| 1,621,807 | Owens | Mar. 22, 1927 |
| 1,670,501 | Goodspeed | May 22, 1928 |
| 1,749,249 | Van Item | Mar. 4, 1930 |
| 1,781,943 | Bartholowmeu | Nov. 18, 1930 |
| 1,834,902 | Payzant | Dec. 1, 1931 |
| 1,836,362 | Crowley | Dec. 15, 1931 |
| 1,914,241 | Campbell | June 13, 1933 |
| 2,452,392 | Philbin | Oct. 26, 1948 |
| 2,521,088 | Phelps | Sept. 5, 1950 |

FOREIGN PATENTS

| | | |
|---|---|---|
| 252,876 | Great Britain | June 10, 1926 |